March 23, 1971 W. ORT 3,572,231
DELAYED ACTION DEVICE FOR FOCAL PLANE SHUTTER CAMERA
Filed July 25, 1968

INVENTOR
WOLFGANG ORT
BY
ATTORNEYS

United States Patent Office 3,572,231
Patented Mar. 23, 1971

3,572,231
DELAYED ACTION DEVICE FOR FOCAL
PLANE SHUTTER CAMERA
Wolfgang Ort, Stuttgart-Bad Cannstatt, Germany, assignor to Eastman Kodak Company, Rochester, N.Y.
Filed July 25, 1968, Ser. No. 747,591
Int. Cl. G03b 9/32
U.S. Cl. 95—57                                       7 Claims

ABSTRACT OF THE DISCLOSURE

A photographic camera has a locking mechanism to prevent the second curtain of a delayed action two-curtain shutter from returning to its inoperative position until actuation of the first curtain shutter is completed. The locking mechanism is released by a gear member operating with the first shutter curtain.

BACKGROUND OF THE INVENTION

This invention relates to photographic cameras, and more particularly to cameras incorporating certain shutter mechanisms.

Description of the prior art

Cameras with shutter mechanisms employing two shutter curtains in the focal plane of the light sensitive film gate are known. Such shutter mechanisms are particularly useful in single lens reflex cameras in which a mirror is inserted in the optical path for viewing, and then removed from the optical path before actuation of the shutter mechanism to expose the film. Devices are known in the art which will cause actuation of the shutter curtain mechanisms after the mirror has been removed from the optical path.

In such cameras, it is necessary that the two shutter curtains be operated in proper sequence. Upon actuation of a release mechanism, a first shutter curtain is removed from in front of the light sensitive film so as to expose the film. After a determined time, either predetermined or controlled by the operator, the second shutter curtain is placed in front of the light sensitive film to terminate exposure.

It is desirable that cameras of this type be so formed that the light sensitive film is not only exposable for a predetermined and preset time, but that it be exposable for "time" exposures of a length determined by the operator, rather than by a preset timing mechanism. Obviously, it is desirable that the same mechanism within the camera be used for both types of exposures.

As previously mentioned, in reflex type cameras, mechanisms have been described for actuating the first shutter mechanism upon the completion of operation of the mirror control mechanism to move the mirror out of the optical path of the focal plane. Further, devices have been shown which do not allow the second shutter curtain to release until actuation of the camera release mechanism has been terminated for "time" exposures. These devices also actuate a mechanism for operation of the second shutter curtain mechanism during actuation of the first when preset shutter speeds are employed. With these preset shutter speeds, it is known to employ cam gearings to effect release of the second shutter curtain, the cam gearings being driven by operation of the first shutter curtain, with the time interval being controlled by known means. It is also known in cameras of this type to allow the cam gearing to control operation of the second shutter curtain for predetermined exposure times only.

However, it is important to prevent release of the second shutter curtain upon mere release of the release mechanism by the camera operator since, in some circumstances, the first shutter curtain may not have completed its action. In such a situation the light sensitive film would not be properly exposed.

SUMMARY OF THE INVENTION

In accordance with the present invention, a device is provided which will retard operation of the second shutter curtain in a two shutter curtain focal plane exposure arrangement until the first shutter curtain has completed its movement. The mechanism of the present invention can be employed both for exposures of predetermined, preset times and for time exposures.

The mechanism is particularly advantageous in that it prevents release of the second shutter curtain prior to completion of a preset timed exposure, though the operator stops actuation of the release mechanism prior to expiration of the timed exposure. In the case of a timed exposure, the mechanism also assures an exposure during a time exposure cycle.

In a preferred embodiment of the invention, the release mechanism of the camera is held in its operating position by locking means and the locking means is released only after complete operation of the first shutter curtain. This locking means is extremely simple in operation, while at the same time it provides the advantages described.

The invention as well as objects and advantages will become apparent from the detailed description of a preferred embodiment that follows.

BRIEF DESCRIPTION OF THE DRAWING

In the description of the preferred embodiment of the invention, reference is made to the accompanying drawing forming a part of the description and wherein.

DESCRIPTION OF THE PREFERRED EMBODIMENT

Figure 1:
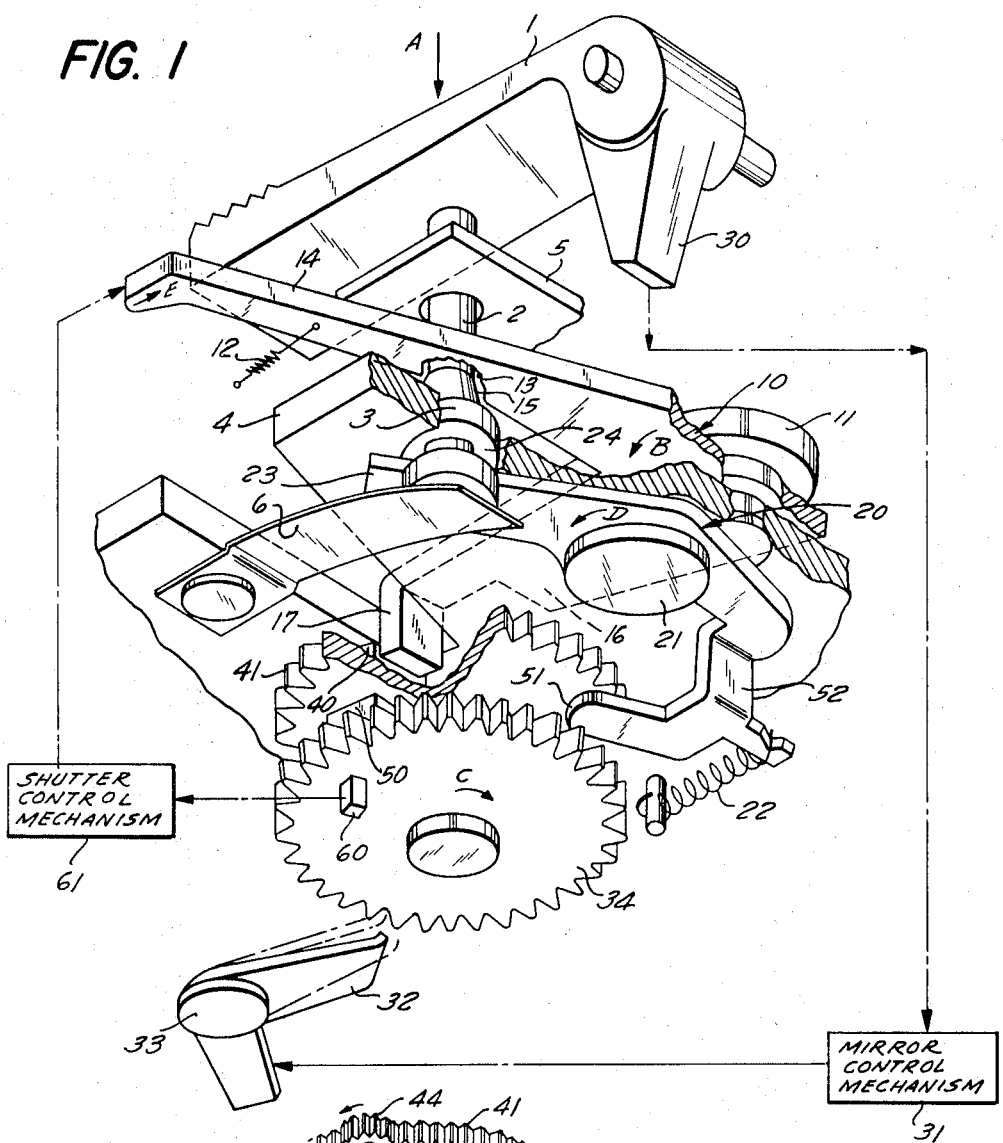
FIG. 1 is a perspective view of the operating mechanism of the present invention, in one stage of operation, and showing the locking means.

Because photographic cameras are well known, the present description will be limited to those elements forming part of or cooperating directly with the present invention, the elements of a camera not shown or described herein being understood to be selected from those known in the art.

Referring to the accompanying drawing, camera operation is initiated by depression of a release member 1 in the direction indicated by arrow A. Depression of this release member causes a plunger 2 to descend through a support ring 3 mounted to a camera body 4, and through an angular support member 5, also mounted to the camera body. Depression of the plunger is accomplished against the action of a spring member 6 which acts to normally bias plunger 2 and release member 1 to their upward positions.

As plunger 2 is lowered, a lever 10 pivots about pin 11 due to the biasing action of a spring 12 and the resting of portion 13, which is bevelled (not shown), of an arm 14 of lever 10 against the cone portion 15 of plunger 2. As lever 10 is rotated in the direction indicated by arrow B, arm 16 of this lever rotates in such a manner as to place a bent lug 17 in front of projection 40 formed on gear wheel 41, for a purpose to be hereinafter described.

Additionally, as plunger 2 is lowered, locking lever 20 pivots about pin 21 under the biasing action of spring 22. This causes arm 23 of locking lever 20 to engage in the circumferential recess 24 formed in plunger 2. Arm 23 thereby prevents spring member 6 from biasing plunger 2 and release member 1 upward.

Simultaneously, as release member 1 is depressed, an arm 30 of this release member acts upon a mirror control mechanism 31 which causes detent 32 to rotate about pin 33 so as to release gear 34. Such mirror control mechanisms are known in the art and, therefore, are not described here.

Figure 2:
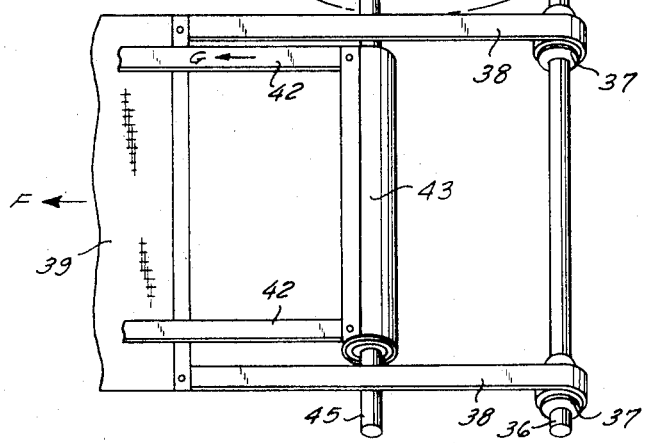
FIG. 2 is a perspective view showing a portion of the operating mechanism connected to the shutter curtains.

Gear 34 is operatively engaged with pinion 35, connected to a roller 36. This roller is connected, through pulleys 37 and ribbons 38 to a first shutter curtain 39. The opposite end of this shutter curtain is formed, in known manner, about a spring loaded roller (not shown) which acts, upon release of detent 32 from gear wheel 34, to roll up the shutter curtain in the direction indicated by arrow F. As can be seen in FIG. 2, the result is to provide an opening in the focal plane of the camera between the ribbons 38 of the first shutter curtain 39 and ribbons 42 of a second shutter curtain 43.

As shutter curtain 39 is rolled up, it causes gear wheel 34 to rotate in the direction indicated by arrow C. When gear wheel 34 has rotated through a sufficient portion of its arc, a projection 50, formed on gear wheel 34, engages a lug 51 formed on a lower bent portion of arm 52 of locking lever 20. This causes locking lever 20 to rotate in the direction indicated by arrow D about pivot 21 against the bias of spring 22 and releases arm 23 from circumferential recess 24. This allows plunger 2 to move upward under the biasing action of spring member 6. However, with preset time operation of the camera, plunger 2 is prevented from moving fully to its initial position until movement of arm 14 of lever 10 away from cone 15 of plunger 2.

As gear wheel 34 rotates, it actuates a shutter control mechanism 61 via a lug 60 or other suitable means. This shutter control mechanism includes a cam gearing and a timing mechanism which is set in accordance with the desired exposure time, in known manner and by known means. After the proper time interval, this shutter control mechanism 61 causes arm 14 of lever 10 to move in the direction indicated by the arrow E, which simultaneously releases the plunger to return to its initial position and moves bent lug 17 away from projection 40 formed on gear wheel 41. Gear wheel 41 is operatively connected to pinion 44 to which spindle 45 is attached. Second shutter curtain 43 is wound on this spindle 45. Ribbons 42 of second shutter curtain 43 are wound about pulleys (not shown) formed on a spring loaded rod (not shown). Movement of bent lug 17 away from projection 41 allows gear wheel 40 to turn freely under the pull of the spring loaded rod and causes second shutter curtain 43 to be drawn over the light sensitive film, in the direction indicated by arrow G, to end the exposure.

This arrangement is especially effective for exposures of predetermined time lengths, as it allows for a correct exposure even if the release member is depressed for only a short period of time. This is true because the second shutter curtain 43 is not actuated until arm 14 of lever 10 is moved by control mechanism 61. Bent lug 17 of lever 10 prevents operation of the second shutter curtain mechanism until that time.

In known manner, when the camera is cocked, the two gear wheels 34 and 41 are rotated together, by means not shown. This rotation is in the direction opposite that indicated by arrow C and acts not only to position the gear wheels, but additionally to place the springs of the shutter curtain rollers under tension to provide for the movement of the shutter curtains 39 and 43 upon release of the gear wheels 34 and 41 as described above.

In employing the mechanism for time exposure, the control mechanism is disconnected from arm 14 of lever 10. Except for this, the device operates in the manner just described. Thus, particularly, depression of release member 1 causes arm 23 of locking lever 20 to hold plunger 2 in its lowered position against the bias of spring member 6. The exposure is stopped when the operator allows release member 1 to return to its upper position to which it is urged by spring member 6. With control means 61 disconnected from arm 14, the action of cone 15 on bevelled portion 13 is such as to swing arm 14 of lever 10 in the direction indicated by arrow E and thus release projection 40 from the holding action of bent lug 17. However, even if the operator allows the release member to move to its upward position, there can be no movement of the plunger until the first shutter curtain has been actuated. This is due to the fact that arm 23 of locking lever 20 remains engaged with the circumferential depression 24 on plunger 2. Actuation of the mechanism of first shutter curtain 39 causes projection 50 on gear wheel 34 to engage lug 51 of locking lever 20 and disengage arm 23 from circumferential recess 24. Plunger 2 is then allowed to move upward under the urging of spring 6, thus moving arm 14 of lever 10 in the direction indicated by arrow E, to allow operation of the second shutter mechanism.

The mirror control mechanism 31 can be of the type which causes the mirror to return to its viewing position following actuation of the second shutter curtain 43, or it can be of the type which allows the mirror to remain in a position out of the camera's optical path until the camera is cocked for a subsequent exposure. The positioning of the mirror, pear se, forms no part of the present invention.

Thus, it can be seen that the plunger is prevented from returning to its initial position until the first shutter mechanism has been actuated, even though the operator has ceased depressing release member 1. Premature actuation of the second shutter curtain mechanism thereby is prevented.

The invention has been described in detail with particular reference to a preferred embodiment thereof, but it will be understood that variations and modifications can be effected within the spirit and scope of the invention as described hereinabove and as defined in the appended claims.

I claim:
1. In a photographic camera having first and second shutter curtains which coact to provide for exposure of a light sensitive film, said first shutter curtain being terminably operable to initiate exposure of the film and said second shutter curtain being operable to terminate exposure of the film, means to initiate operation of said first shutter curtain and means to initiate operation of said second shutter curtain, the improvement comprising:
   (a) means for releasably locking said second shutter curtain against operation; and
   (b) means associated with said first shutter curtain operating means for releasing said locking means upon termination of the operation of said first shutter curtain.

2. In a photographic camera having first and second shutter curtains which cooperate to provide for exposure, an operating mechanism comprising:
   (a) a release member for actuating said camera;
   (b) means operatively associated with said release member for operating said first shutter curtain;
   (c) a plunger movable by said release member from an initial position to an operating position and operable during movement back to the initial position to actuate said second shutter curtain;
   (d) locking means preventing said plunger from movement to its initial position; and
   (e) means associated with said first shutter curtain to release said locking means after operation of the first shutter curtain so as to actuate said second shutter curtain.

3. The camera of claim 2, and further comprising a spring member biasing said plunger toward said initial position, wherein the locking means prevents movement of the plunger in response to the spring bias.

4. The camera of claim 3, wherein said locking means is a pivoted lever having at least two arms, one arm of which engages said plunger and another arm of which is moved by the first shutter curtain operating means to release the first arm from the plunger.

5. In a reflex photographic camera having a picture taking optical path with a viewing mirror positionable in the optical path and having first and second shutter curtains which cooperate to provide for exposure of a light sensitive material, each shutter curtain being spring loaded for operation, the combination comprising:
   (a) a release member for actuation of said camera to provide for exposure;
   (b) means associated with said release member to move said mirror from the optical path and initiate operation of said first shutter curtain;
   (c) a plunger moved from an initial position to a second position against a spring bias by movement of said release member, wherein return movement of said plunger from the second position toward the initial position actuates said second shutter curtain;
   (d) locking means operatively engaging the plunger to prevent return movement of said plunger until operation of said first shutter curtain; and
   (e) means associated with said first shutter curtain operation initiating means to disengage said locking means from said plunger.

6. The camera of claim 5, wherein said locking means comprises a pivoted lever having at least two arms, one arm of said lever engaging said plunger and another arm of said lever engageable with said first shutter curtain operation initiating means to disengage said locking means from said plunger.

7. The camera of claim 6, wherein the operation initiating means for the first shutter curtain comprises:
   (a) a rotatable gear wheel, said wheel being rotated with movement of said first shutter curtain; and
   (b) projection means on said gear wheel to engage the other arm of said lever upon rotation of said gear wheel.

References Cited
UNITED STATES PATENTS

| | | | |
|---|---|---|---|
| 2,417,482 | 3/1947 | Gacki | 95—57 |
| 2,673,501 | 3/1954 | Duchatellier | 95—57 |
| 2,953,982 | 9/1960 | Anzai | 95—57 |

JOHN M. HORAN, Primary Examiner

M. HARRIS, Assistant Examiner